US009294196B2

(12) United States Patent
Gaete et al.

(10) Patent No.: US 9,294,196 B2
(45) Date of Patent: *Mar. 22, 2016

(54) METHOD FOR PROCESSING DATA IN AN OPTICAL NETWORK ELEMENT AND OPTICAL NETWORK ELEMENT

(71) Applicant: Xieon Networks S.a.r.l., Luxembourg (LU)

(72) Inventors: Oscar Gaete, Munich (DE); Leonardo Coelho, Munich (DE); Bernhard Spinnler, Oberhaching (DE); Norbert Hanik, Berlin (DE); Ernst-Dieter Schmidt, Feldkirchen-Westerham (DE)

(73) Assignee: Xieon Networks S.a.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/452,073

(22) Filed: Aug. 5, 2014

(65) Prior Publication Data
US 2014/0341576 A1 Nov. 20, 2014

Related U.S. Application Data

(63) Continuation of application No. 13/501,814, filed as application No. PCT/EP2009/067584 on Dec. 18, 2009, now Pat. No. 8,798,471.

(30) Foreign Application Priority Data

Oct. 13, 2009 (EP) ..................... 09172934

(51) Int. Cl.
*H04B 10/00* (2013.01)
*H04B 10/27* (2013.01)
*H04L 27/20* (2006.01)
*H04L 27/26* (2006.01)

(52) U.S. Cl.
CPC ............ *H04B 10/27* (2013.01); *H04L 27/2096* (2013.01); *H04L 27/2628* (2013.01); *H04L 27/2697* (2013.01)

(58) Field of Classification Search
USPC .................................................. 398/182–201
See application file for complete search history.

(56) References Cited

U.S. PATENT DOCUMENTS 6,377,529 B1    4/2002  Lee et al.
6,442,214 B1 *  8/2002  Boleskei ............. H04B 7/0854
                                              375/260
6,473,467 B1 * 10/2002  Wallace .............. H04B 7/0417
                                              370/208

(Continued)

FOREIGN PATENT DOCUMENTS

EP          1928115 A1    6/2008

OTHER PUBLICATIONS

Jansen, S.L. et al., "10x191.9-Gb/s PDM-OFDM Transmission with 2-b/sHz Spectral Efficiency over 1,000 km of SSMF," National Fiber Optic Engineers Conference, Optical Society of America Technical Digest, pp. 1-3 (2008).

(Continued)

*Primary Examiner* — Agustin Bello
(74) *Attorney, Agent, or Firm* — Nelson Mullins Riley & Scarborough LLP

(57) ABSTRACT

A method for processing data in an optical network element is provided, wherein a multicarrier signal is linear pre-coded, and wherein the linear pre-coded signal is modulated. An according optical network element is also suggested.

11 Claims, 3 Drawing Sheets

(56) References Cited

U.S. PATENT DOCUMENTS

| | | | |
|---|---|---|---|
| 6,654,431 B1 | 11/2003 | Barton et al. | |
| 6,865,237 B1* | 3/2005 | Boariu | H04B 7/0669 375/295 |
| 6,898,248 B1* | 5/2005 | Elgamal | H04L 1/0048 375/259 |
| 6,956,815 B2* | 10/2005 | Chiodini | H04L 25/03006 370/209 |
| 7,224,744 B2* | 5/2007 | Giannakis | H04L 1/0054 375/267 |
| 7,251,768 B2* | 7/2007 | Giannakis | H03M 13/29 375/262 |
| 7,280,604 B2* | 10/2007 | Giannakis | H04L 1/0055 375/260 |
| 7,292,647 B1* | 11/2007 | Giannakis | H04L 1/0041 375/295 |
| 7,298,785 B2* | 11/2007 | Suzuki | H04L 27/265 375/260 |
| 7,430,243 B2* | 9/2008 | Giannakis | H04L 27/2608 370/208 |
| 7,433,419 B2 | 10/2008 | Yun et al. | |
| 7,440,510 B2* | 10/2008 | Sandhu | H04L 1/0071 375/265 |
| 7,486,739 B2* | 2/2009 | Hottinen | H04L 1/0612 375/260 |
| 7,489,748 B2* | 2/2009 | Bouvet | H04L 1/005 375/267 |
| 7,539,259 B2* | 5/2009 | Dias | H04B 7/04 375/260 |
| 7,555,061 B2 | 6/2009 | Katagiri et al. | |
| 7,580,630 B2 | 8/2009 | Kee et al. | |
| 7,593,449 B2* | 9/2009 | Shattil | H04B 1/707 375/130 |
| 7,633,923 B2* | 12/2009 | Gorokhov | H04L 1/0041 370/343 |
| 7,706,454 B2* | 4/2010 | Giannakis | H04B 7/0669 375/260 |
| 7,715,731 B2 | 5/2010 | Elahmadi et al. | |
| 7,817,712 B2 | 10/2010 | Hidaka | |
| 7,848,218 B2* | 12/2010 | Lee | H04B 7/068 370/208 |
| 8,068,742 B2 | 11/2011 | Cole et al. | |
| 8,073,338 B2 | 12/2011 | Buelow | |
| 8,090,050 B2 | 1/2012 | Suzuki et al. | |
| 8,098,755 B2 | 1/2012 | Kim et al. | |
| 8,194,767 B2 | 6/2012 | Duvaut et al. | |
| 8,228,784 B2* | 7/2012 | Coon | H04J 13/18 370/208 |
| 8,265,489 B2 | 9/2012 | Kikuchi | |
| 8,275,257 B2 | 9/2012 | Forghieri et al. | |
| 8,437,638 B2 | 5/2013 | Kobayashi et al. | |
| 8,588,317 B2 | 11/2013 | Giannakis et al. | |
| 8,798,471 B2* | 8/2014 | Gaete | H04L 27/2096 398/182 |
| 9,036,997 B2* | 5/2015 | Rekaya-Ben Othman | H04B 10/506 398/141 |
| 2003/0133403 A1 | 7/2003 | Castelain et al. | |
| 2003/0133404 A1 | 7/2003 | Castelain et al. | |
| 2004/0146014 A1* | 7/2004 | Hammons, Jr. | H04L 1/0059 370/320 |
| 2005/0058217 A1* | 3/2005 | Sandhu | H04L 1/0606 375/267 |
| 2005/0253745 A1 | 11/2005 | Song et al. | |
| 2005/0281357 A1 | 12/2005 | Bouvet et al. | |
| 2006/0140294 A1* | 6/2006 | Hottinen | H04L 27/2602 375/260 |
| 2006/0256839 A1 | 11/2006 | Tsai et al. | |
| 2006/0268165 A1* | 11/2006 | van Nee | H04B 7/0671 348/388.1 |
| 2007/0286302 A1* | 12/2007 | Hwang | H04B 7/0617 375/267 |
| 2008/0043857 A1 | 2/2008 | Ribeiro Dias et al. | |
| 2008/0118246 A1 | 5/2008 | Steidl et al. | |
| 2008/0212695 A1 | 9/2008 | Mo et al. | |
| 2008/0260078 A1* | 10/2008 | Bouvet | H04L 1/0618 375/346 |
| 2008/0311939 A1* | 12/2008 | Hugl | H04B 7/0417 455/507 |
| 2009/0074050 A1 | 3/2009 | Wang et al. | |
| 2009/0154588 A1* | 6/2009 | Chen | H04L 1/0029 375/267 |
| 2009/0213907 A1* | 8/2009 | Bottomley | H04L 25/03203 375/148 |
| 2009/0257755 A1 | 10/2009 | Buelow | |
| 2010/0002575 A1 | 1/2010 | Eichinger et al. | |
| 2012/0025800 A1 | 2/2012 | Dettloff et al. | |
| 2012/0224866 A1* | 9/2012 | Gaete | H04L 27/2096 398/186 |
| 2014/0341576 A1* | 11/2014 | Gaete | H04L 27/2096 398/58 |

OTHER PUBLICATIONS

Jansen, Sander L et al., "Coherent Optical 25.8-Gb/s OFDM Transmission Over 4160-km SSMF," Journal of Lightwave Technology, vol. 26(1):6-15 (2008).

Ma, Xiaoli et al., "Non-Data-Aided Carrier Offset Estimators of OFDM With Null Subcarriers: Identifiability, Algorithms, and Performance," IEEE Journal on Selected Areas in Communications, vol. 19(12):2504-2515 (2001).

Schmidt, Brendon J.C. et al., "Experimental Demonstrations of 20 Gbit/s Direct-Detection Optical OFDM and 12 GBit/s with a colorless transmitter," Optical Fiber Communication Conference and Exposition and the National Fiber Optic Engineers Conference, OSA Technical Digest Series, pp. 1-3 (2007).

Schuster, Matthias et al., "120 Gb/s OFDM Transmission with Direct Detection using Compatible Single-Sldeband Modulation," OFC/NFOEC 2008 Conference on Optical Fiber Communication/National Fiber Optic Engineers Conference, pp. 1-3 (2008).

Winzer, Peter J. et al., "Advanced Modulation Formats for High-Capacity Optical Transport Networks," Journal of Lighwave Technology, vol. 24(12):4711-4728 (2006).

* cited by examiner

METHOD FOR PROCESSING DATA IN AN OPTICAL NETWORK ELEMENT AND OPTICAL NETWORK ELEMENT

CROSS REFERENCE TO RELATED APPLICATIONS

The present application is a continuation application of U.S. patent application Ser. No. 13/501,814, filed May 11, 2012. The invention described and claimed herein is also described in PCT/EP2009/067584, filed on Dec. 18, 2009, and EP 09172934.3, filed on Oct. 13, 2009. This European Patent Application, whose subject matter is incorporated here by reference, provides a basis for a claim of priority under 35 U.S.C. 119(a)-(d)

The invention relates to a method and to a device for processing data in an optical network element and to an according optical network element.

With broadband Internet connections and mobile data transfer becoming ubiquitous technologies, requirements regarding bitrates over WDM optical channels are increasing. In this context, a spectral efficiency of a modulation format used is of significant relevance.

The spectral efficiency of an optical signal can be increased, e.g., by multilevel modulation, polarization multiplexing, orthogonal frequency multiplexing or a combination thereof. However, the complexity of the system noticeably increases with the modulation.

When multilevel modulation format and polarization multiplexing were chosen to increase the spectral efficiency (SE) of a transmission system, orthogonal frequency division modulation (OFDM) is a subsequent step that doubles the SE by overlapping the spectra of a multitude of subcarriers.

For example, a binary on-off-keying (OOK) signal with a data rate of 100 Gbps uses 200 GHz of optical bandwidth (BW). If OFDM is used with quadrature-phase-shift-keying (QPSK) modulated subcarriers and polarization multiplexing (PolMux) a 100 Gbps line rate signal would roughly use 25 GHz optical bandwidth.

However, such an advanced modulation format would require the use of digital coherent detection, and therefore, greatly increase the complexity of the implementation, because of the need for advance digital signal processing (DSP) and an optical local oscillator.

A reduced complexity of the implementation could be achieved by using a direct detectable OFDM signal, but a reference carrier has to be sent along the data signal situated at a distance in spectrum equal to the BW of the OFDM signal, which reduces the SE. Another possibility is the use of a Compatible Single Sideband OFDM modulation (CompSSB-OFDM). However, a very high power carrier is required in this case, also compromising an overall performance of the system.

In addition, all such cases of enhanced SE require complex DSP algorithms that need to be implemented in the transmitter and the receiver.

For high data rates (>10 Gbps), the use of DSP is a challenging problem not only concerning the developments of high-speed electronics, but also with regard to an energy consumption of next generation high-speed systems.

The problem to be solved is to overcome the disadvantages mentioned above and in particular to provide a high degree of spectral efficiency without a high complexity of digital signal processing in an optical system.

This problem is solved according to the features of the independent claims. Further embodiments result from the depending claims.

In order to overcome this problem, a method is suggested for processing data in an optical network element,
wherein a multicarrier signal is linear pre-coded,
wherein the linear pre-coded signal is modulated.

The proposed method in particular doubles the spectral efficiency of an optical signal while maintaining a low complexity of the system. This allows for example, the use of high-speed 100 Gbps signals in dense WDM systems without the need of polarization multiplexing or complex digital signal processing at the receiver, therefore allowing for a cost efficient approach.

The approach further increases the spectral efficiency of signals and provides compatibility with direct detection receivers. Hence, in particular no local oscillator is required at the receiver.

In an embodiment, the pre-coded signal is modulated by a differential phase modulation or by an amplitude modulation.

It is noted that direct detection modulation formats can be utilized, in particular OOK, DPSK, DQPSK, D8PSK, Star-D8QAM, Star-D16QAM, PAM, etc.

In another embodiment, the multicarrier signal is linear pre-coded, wherein each subcarrier is a linear combination of all other subcarriers.

Hence, after direct detection at a receiver, at each k-th sampling point, the electrical signal has a value proportional to the k-th subcarrier.

In a further embodiment, the multicarrier signal is linear pre-coded by a matrix T, wherein the coefficients of a linear combination of a k-th subcarrier correspond to the k-th row of an DFT matrix.

In a next embodiment, a channel transfer function is pre-compensated by an equalization.

This equalization can be conducted at the optical network element after the linear pre-coding. Advantageously, the signal can be sent via a dispersion-unmanaged link.

It is also an embodiment that said equalization is a one tap equalization.

Pursuant to another embodiment, a subcarrier is discarded by a receiver in case the subcarrier experiences deforming (e.g., due to distortions) and/or attenuating effects above a given threshold.

In such case, the receiver may (temporarily) discard at least one subcarrier. The receiver may inform the transmitter of the discarded subcarrier and the transmitter may no longer use this subcarrier towards this receiver.

According to an embodiment, a dummy subcarrier is used to provide a guard band.

Advantageously, such guard band is useful to reduce (inter-symbol) interference from a previously pre-coded block.

According to another embodiment, a zero padding is conducted prior to an inverse discrete Fourier transform.

Advantageously, this zero padding simplifies filtering at the receiver. Zero padding can be adjusted to the filtering capability of the respective transmitter.

In yet another embodiment, a feedback channel is provided to convey information from a receiver to the optical network element.

Such feedback channel can be utilized for various purposes. The optical network element may in particular adjust its signals to increase the efficiency based on the information obtained via the feedback channel.

According to a next embodiment, the optical network element is an optical transmitter, e.g., an optical line terminal or an optical network unit.

The problem stated above is also solved by an optical network element comprising
- a linear pre-coder processing a multicarrier signal,
- a modulator processing the linear pre-coded signal.

Pursuant to yet an embodiment, the optical network element further comprises a zero padding unit prior to an inverse discrete Fourier transform unit prior to said modulator.

It is noted that said modulator may advantageously comprise at least one digital operation.

It is also an option that the modulator is a differential modulator or an amplitude modulator According to an embodiment, the optical network element comprises a control unit that is arranged such that the method as described herein can be executed.

The problem stated supra is further solved by an optical communication system comprising the optical network element as described herein.

Figure 1:
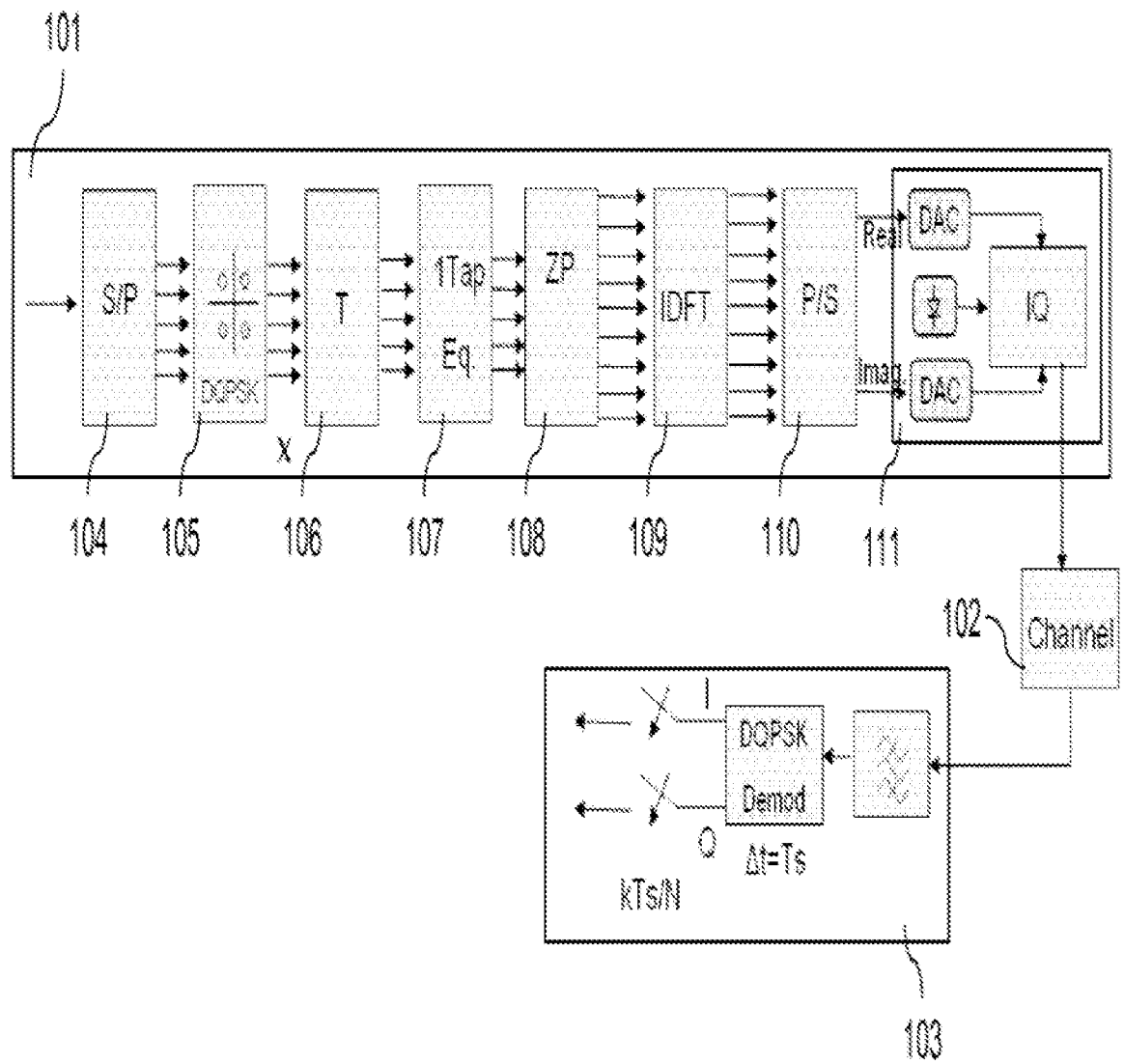
FIG. 1 shows a transmission scheme comprising a block diagram of a transmitter, a channel and a receiver.

The solution provided in particular suggests a discrete inverse Fourier transform in the transmitter that increases the spectral efficiency of an optical signal by shaping its spectrum in an OFDM-like fashion. In addition, it makes the signal compatible with direct detection, without the need for digital signal processing and without having to send an optical carrier along the signal. Hence, without such need for complex DSP, the complexity is feasible even for high data rates (e.g., >10 Gbps) and a high spectral efficiency is achieved as no bandwidth is to be reserved for an optical carrier.

At the transmitter, an optical OFDM-like signal is generated, wherein each optical subcarrier is a linear combination of all other subcarriers, so that after direct detection, at each k-th sampling point, the electrical signal has a value proportional to the k-th subcarrier.

The transmitter may be implemented using a moderate amount of DSP, digital to analog converters (DACs) and one optical IQ modulator. No DSP is needed at the receiver (therefore also no ADCs) to demodulate the OFDM-like signal. The receiver maintains the complexity of its single-carrier counterpart.

It is also an option that after the electrical I- and Q-signals are generated, they can be up-mixed to an intermediate frequency by an electrical IQ-modulator. The output thereof can be used to modulate a laser diode via an optical amplitude modulator, e.g., a mach-zehnder modulator. Then, an optical filter can be used to filter one sideband of the optical signal.

As increased SE is desired, one attractive application would be to use this technique with DQPSK mapped subcarriers to form a 100 Gbps optical signal without PolMux and without DSP at the receiver. Instead, a simple DQPSK demodulator can be used at the receiver. In this case, the signal shows a 50 GHz bandwidth and therefore would be compatible with DWDM systems.

It is also an option to use PolMux and higher level modulation, therefore increasing the SE even further but retaining the complexity of a receiver equal to the case where direct detected single carrier is used.

Another advantage is that, as each subcarrier is available at the transmitter separately; simple one tap equalization can be performed for pre-compensating the channel transfer function. This allows, e.g., to send such a signal through a dispersion-unmanaged link (i.e., without dispersion compensation modules).

It is a further option of this approach to allow the receiver to perform simple subcarrier selection. Some detrimental effects on the link (i.e., narrowband filtering) may affect some subcarriers in a stronger way than others. Such bad subcarriers can be discarded easily by the receiver by just ignoring certain sample instants. Similar, dummy subcarriers can be used (containing no useful information or no information at all, i.e. always zero amplitude) to form guard bands that help maintaining the performance.

It is noted that the approach presented can be used with modulation formats that are in particular compatible with direct detection, e.g., OOK, DPSK, DQPSK, DQPSK, Star-D8QAM, Star-D16QAM, PAM, etc.

Here, DQPSK is an example for such modulation format. Other modulation formats may be applicable as well.

FIG. 1 shows a transmission scheme comprising a block diagram of a transmitter 101, a channel 102 and a receiver 103.

Transmitter:

The transmitter 101 according to FIG. 1 will be described in detail.

(1) A logical binary data sequence is input to an M*N serial to parallel module 104. M depends on the modulation format: For OOK or BPSK, M equals 1, for QPSK, M amounts to 2, and so on (M-ary modulation).

(2) After parallelization each of the N sequences are mapped independently according to the desired modulation format (see block 105).

The symbol duration (Ts) is equal to the inverse of the total data rate (Br) multiplied by (M*N).

A vector x is provided as an output of the block 105.

(3) At each Ts instant the vector x composed by the N mapped DQPSK symbols is multiplied by a transform matrix T in a block 106 providing a vector Tx.

(4) Then in order to invert the channel response, one tap equalization (see block 107) is performed on each element of the vector Tx.

(5) Before performing the inverse DFT at the transmitter, as an option, zero padding (ZP) is used to ease the filtering of the images of the digital signal that causes aliasing (see block 108).

(6) After this block 108, the resulting vector is multiplied by the inverse DFT matrix in a block 109.

(7) The output vector of the block 109 is serialized in a block 110 and the real part and imaginary part of the sequence are fed to an optical IQ modulator 111. As an alternative, an electrical IQ-modulator can be used as indicated above.

(8) The output signal of the optical IQ modulator 111 is fed over the channel 102 towards the receiver 103.

The Transform Matrix

The output of the transmitter 101 is an OFDM-like signal, each subcarrier is a combination of the data vector x. The matrix T is chosen so that the coefficients of the linear combination of each k-th subcarrier correspond to the k-th row of the DFT matrix.

The purpose of this linear combination is that at the k-th sampling instant the value of the optical signal is proportional to the k-th element of the vector x. Hence, squaring of the direct detector will only affect the k-th element.

The transform matrix T is dependent on the amount of zero padding (ZP). If the amount of ZP is equal or greater than N, then T is equal to the DFT matrix. If the zero padding is smaller than N then T correspond to a permutation of the rows of the DFT matrix. The permutation is dependent on the amount of ZP.

The Receiver

Advantageously, a legacy direct detection receiver 103 may be used depending on the modulation format of the subcarriers. In the case of DQPSK, two delay interferometers with balance detection may be used to separate and demodulate the I- and the Q-components of the optical signal.

Preferably, the delay time is matched to the symbol duration Ts (that is the duration of the "OFDM-like block").

Sampling is done at a rate equal to the data rate divided by the modulation order (i.e. Br/M).

Details Regarding the Processing of Data

The following provides further details of the solution provided and explains its impact on the receiving side.

x is regarded as a vector comprising N elements, i.e.

$$x = \begin{bmatrix} x_0 \\ x_1 \\ \vdots \\ x_{N-1} \end{bmatrix}. \tag{1}$$

A transform matrix of N×N dimension is defined as $$T = \begin{bmatrix} t_{00} & t_{01} & \cdots & t_{0(N-1)} \\ t_{10} & t_{11} & \cdots & t_{1(N-1)} \\ \vdots & \vdots & \ddots & \vdots \\ t_{(N-1)0} & t_{(N-1)1} & \cdots & t_{(N-1)(N-1)} \end{bmatrix}. \tag{2}$$

Further, $t'_n$ is a row of the matrix T, i.e.

$$t'_n = [t_{n0}\, t_{n1} \ldots t_{n(N-1)}]. \tag{3}$$

The transmitter in particular generates a signal as follows:

$$s(t) = \sum_{n=0}^{N-1} t'_n \cdot x \cdot e^{j2\pi f_n \cdot t}. \tag{4}$$

As a first example, the vector x is an intensity modulated signal (ON-OFF-keying), i.e.

$$x_n \in [0;1]. \tag{5}$$

A photodiode may be used at the receiver side to detect and demodulate the signal transmitted. The received sampled signal $\hat{s}$ is sampled at sampling points $$t = \frac{k \cdot \Delta t}{N} \text{ with } k = 0, \ldots, N-1. \tag{6}$$

By utilizing said photodiode the square of the magnitude of the optical signal is received, which (prior to the sampling phase) amounts to $$|s(t)|^2 = \left| \sum_{n=0}^{N-1} t'_n \cdot x \cdot e^{j2\pi f_n \cdot t} \right|^2. \tag{7}$$

After sampling, i.e.

$$t = \frac{k \cdot \Delta t}{N} \text{ and}$$

$$f_n = \frac{n}{\Delta t}$$

the signal amounts to $$\left| s\left(\frac{k \cdot \Delta t}{N}\right) \right|^2 = \left| \sum_{n=0}^{N-1} t'_n \cdot x \cdot e^{j2\pi \frac{n}{\Delta t} \cdot \frac{k \cdot \Delta t}{N}} \right|^2, \tag{8}$$

which corresponds to the inverse Fourier transform of T·x. Equation (8) can be rewritten in matrix form as follows:

$$\hat{s}_k = \left| s\left(\frac{k \cdot \Delta t}{N}\right) \right|^2 = (e_k \cdot W^{-1} \cdot T \cdot x) \cdot (e_k \cdot W^{-1} \cdot T \cdot x)*, \tag{9}$$

wherein (...)* denotes a transposed conjugated matrix and $e_k$ identifies a k-th row of the identity matrix, e.g., $$e_2 = [0\, 1\, 0\, 0 \ldots 0].$$

In addition, $W^{-1}$ refers to an inverse discrete Fourier transform (DFT) matrix.

Equation (9) can be rewritten as follows:

$$\hat{s}_k = e_k \cdot W^{-1} \cdot T \cdot x \cdot x* \cdot T* \cdot W^{-1}* \cdot e*_k. \tag{10}$$

The transform matrix T may be equal to the DFT matrix W (transforming with DFT). Thus, equation (10) results in $$\hat{s}_k = e_k \cdot x \cdot x* \cdot e*_k \tag{11}$$

and thus in $$\hat{s}_k = |x_k|^2. \tag{12}$$

Therefore, at the suitable sampling point $$t = \frac{k \cdot \Delta t}{N}$$

if the transform matrix T equals the DFT matrix W, the k-th sampling value equals the k-th element of the vector x (magnitude square according to equation (12)).

If $x_k$ was intensity-modulated (i.e. $x_k \in [0; 1]$), the signal $|x_k|^2$ will also amount to either 0 or 1.

It is noted that the sampling points may be determined based on, e.g., a bit error rate. A suitable sampling point may thus correspond to an optimized or suitable bit error rate. Hence, the sample points may be chosen that allow for such an acceptable (or optimal) bit error rate.

It is further noted that the sampling points may be iteratively or dynamically adjusted by tracing the bit error rate. The receiver may hence at a given time check whether an adjustment of the sampling points result in an improved bit error rate and thus adjust the timing accordingly.

In addition to the OOK example described above, DQPSK modulation is another example that could be utilized, which in further detail is described hereinafter.

As shown with regard to OOK, the transmitter generates a signal s(t) pursuant to equation (4). Now, the vector x is DQPSK modulated, i.e. information is encoded in the phase difference of subsequent signals $x_k(t)$ and $x_k(t-\Delta t)$ for k=0, ..., N−1.

A delay-interferometer plus balance detection can be used to obtain signals I(t) and Q(t) from the signal s(t). The signals I(t) and Q(t) received are sampled at sampling points $$t = \frac{k \cdot \Delta t}{N} \text{ with } k = 0, \ldots, N-1 \quad (13)$$

to obtain signal vectors $\hat{I}$ and $\hat{Q}$.

Prior to the sampling phase at the receiver, according to the transfer function (in time) of the demodulator, the signal received can be denoted as $$I(t) = \Re\{s(t) \cdot s^*(t-\Delta t) \cdot e^{-j\pi/1}\} \quad (14)$$

Hence, the signal I(t) is derived from the real part $\Re\{\ldots\}$, wherein the signal Q(t) is accordingly derived from the imaginary part $\Im\{\ldots\}$.

After the sampling phase, equation (14) results in $$I\left(\frac{k \cdot \Delta t}{N}\right) = \Re\left\{s\left(\frac{k \cdot \Delta t}{N}\right) \cdot s^*\left(\frac{(k-1) \cdot \Delta t}{N}\right) \cdot e^{-j\frac{\pi}{4}}\right\} \quad (15)$$

or $$I\left(\frac{k \cdot \Delta t}{N}\right) = \Re\left\{\sum_{n=0}^{N-1} t'^*_n \cdot x^*(k-1) \cdot e^{-j2\pi n(k-1)-j\frac{\pi}{4}} \cdot \sum_{n=0}^{N-1} t'^*_n \cdot x^*(k-1) \cdot e^{-j2\pi n(k-1)-j\frac{\pi}{4}}\right\}. \quad (16)$$

With $$\varphi = \frac{\pi}{4},$$

equation (14) can be rewritten in matrix form $$\hat{I}_k = \Re\{(e_k \cdot W^{-1} \cdot T \cdot x(k))(e_k \cdot W^{-1} \cdot T \cdot x_\phi(k-1))^*\} \quad (17)$$

and further to $$\hat{I}_k = \Re\{e_k \cdot W^{-1} \cdot T \cdot x(k) \cdot x_\phi^*(k-1) \cdot T^* \cdot W^{-1*} \cdot e^*_k\}. \quad (18)$$

The transform matrix T may be equal to the DFT matrix W (transforming with DFT). Thus, equation (18) results in $$\hat{I}_k = \Re\{e_k \cdot x(k) \cdot x_\phi^*(k-1) \cdot e^*_k\} \quad (19)$$

and thus in $$\hat{I}_k = \Re\{x_k(k) \cdot x^*_{k\phi}(k-1)\}, \quad (20)$$

which can be denoted as $$\hat{I}_k = \cos(\Phi_k(k) - \Phi_k(k-1) - \phi), \quad (21)$$

which further equals the conventional DQPSK with $$\Phi = \begin{bmatrix} \Phi_0 \\ \Phi_1 \\ \vdots \\ \Phi_{N-1} \end{bmatrix}$$

and $\Phi_n$ being the phase of $\{x_n\}$.

It is in particular noted that the transform matrix may consider channel characteristics that could be determined in advance to or during data processing. In this case, the transform matrix allows precoding of the data to be conveyed across such a channel in a way that the channel's distortions are at least partially compensated. Hence, noise and/or interference imposed on the channel, e.g., near end and/or far end cross talk, can (at least partially) be compensated. In addition, dispersion of an optical fiber could be compensated by the transform matrix.

In order to consider channel characteristics, the transform matrix may be $$T = H_D^{-1} \cdot W,$$

wherein $H_D^{-1}$ denotes a diagonal matrix comprising the channel's characteristics.

Common channel estimation techniques could be utilized to determine the characteristics of the channel. One example is a receiver that conveys information regarding the channel quality back to the transmitter (e.g., via a physical or logical feedback channel). In addition, loops can be used at the transmitter to determine crosstalk from adjacent fibers (channels).

However, such predistortion based on channel properties is an option and not necessarily required for the approach presented herein. Insofar, predistortion in the context of this document also comprises a mere transformation utilized by the transform matrix as described and does not require consideration of particular channel characteristics.

Figure 2:
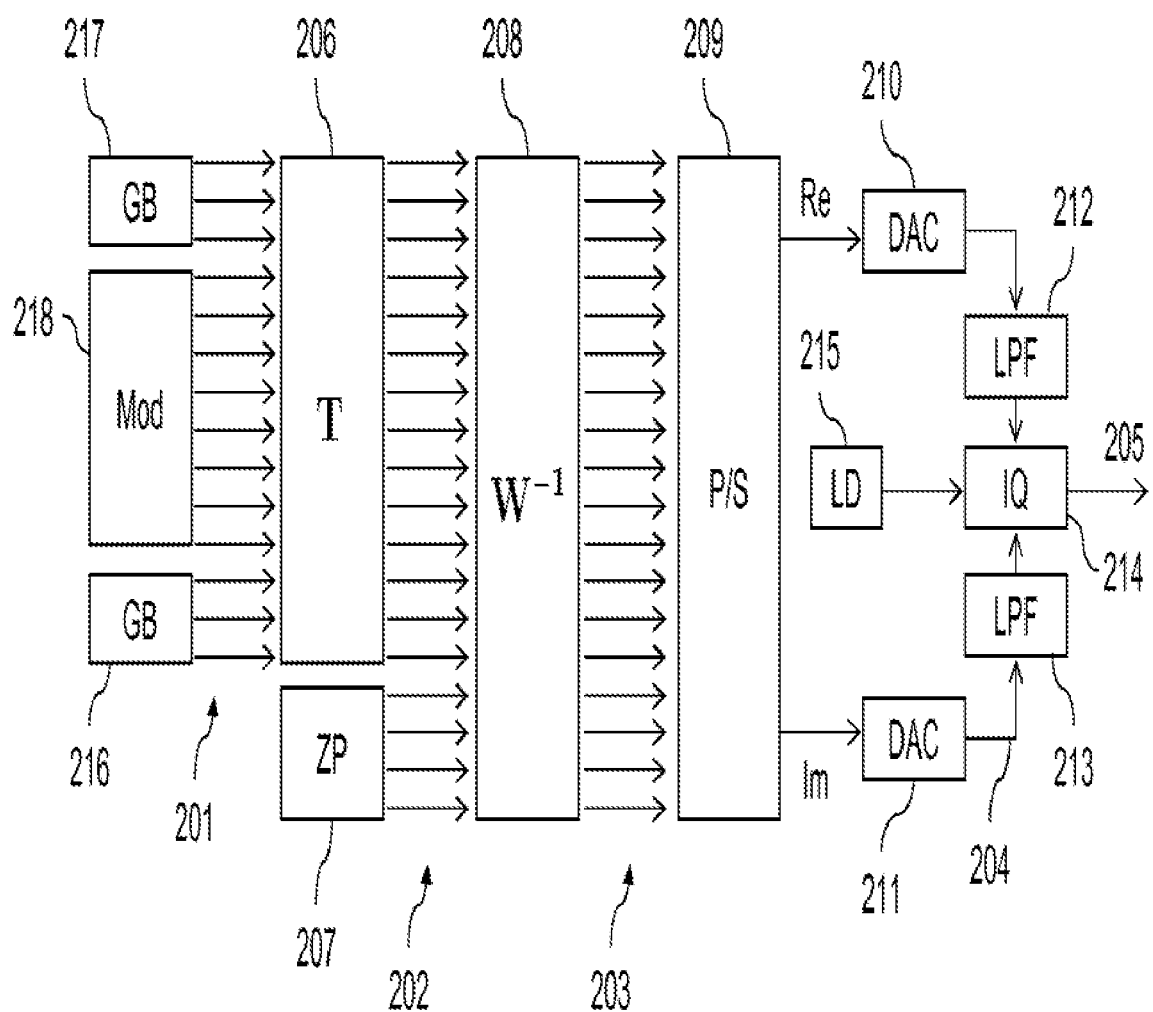
FIG. 2 shows another representation of the transmitter.

FIG. 2 shows another representation of the transmitter. A vector x 201 is generated by a modulator MOD with guard bands (GB) being inserted (see blocks 216, 217 and 218), wherein the vector x 201 pursuant to equation (1) is fed to a processing unit 206, where it is transformed with the matrix T to $\hat{x} = T \cdot x$. Furthermore, zero padding is conducted at a processing unit 207 with a vector z of dimension M×1. An output 202 amounts to $$\tilde{x} = \begin{bmatrix} \hat{x} \\ z \end{bmatrix} = \begin{bmatrix} \tilde{x}_0 \\ \tilde{x}_1 \\ \vdots \\ \tilde{x}_{N+M-1} \end{bmatrix}. \quad (22)$$

This vector $\tilde{x}$ as output 202 is input to an iDFT 208 as indicated by the square matrix $W^{-1}$ of dimension (N+M)×(N+M). An output 203 of the block 208 can be denoted as $$y = W^{-1} \cdot \tilde{x} \quad (23)$$

with $$y = \begin{bmatrix} y_0 \\ y_1 \\ \vdots \\ y_{N+M-1} \end{bmatrix}. \quad (24)$$

Each element of the vector y can be written as $$y_k = \sum_{n=0}^{N+M-1} \tilde{x}_n \cdot e^{j2\pi \frac{nk}{N+M}}, \quad (25)$$

which stems from the fact that the matrix $W^{-1}$ comprises elements $$w_{ij} = e^{j2\pi \frac{ij}{N+M}}. \quad (26)$$

The elements of the vector y can be converted into serial signals by a block 209 and further the imaginary part and the real part can each be serially input to a DAC 210, 211 at time intervals $$t = \frac{k \cdot \Delta t}{N + M} \quad (27)$$

with $0 \leq k \leq N+M-1$.
With $$f_n = \frac{n}{\Delta t},$$

the output signal 204 of the DAC 211 after a low pass filter 213 amounts to $$y_{\mathcal{J}}(t) = \mathcal{J}\left\{ \sum_{n=0}^{N+M-1} \tilde{x}_n \cdot e^{j2\pi f_n t} \right\}. \quad (28)$$

Thus, signal 204 comprises the imaginary part of the complex baseband (BB) representation of the signal that is going to be upconverted at an IQ modulator 214 to the optical carrier frequency provided by a laser diode LD 215.

The baseband (BB) signal can be rewritten as follows:

$$y_{BB}(t) = \sum_{n=0}^{N-1} \tilde{x}_n \cdot e^{j2\pi f_n t} + \sum_{n=M}^{N+M-1} \tilde{x}_n \cdot e^{j2\pi f_n t}. \quad (29)$$

If $$z_n = 0 \,\forall n \in \mathbb{N}^* | 0 \leq n \leq M-1, \quad (30)$$

hence $$z = \begin{bmatrix} 0 \\ 0 \\ \vdots \\ 0 \end{bmatrix}$$

is a vector comprising zeros. Accordingly, $$\tilde{x}_n = 0 \text{ for } N \leq n \leq N+M. \quad (31)$$

Therefore, $$\sum_{n=N}^{N+M-1} \tilde{x}_n \cdot e^{j2\pi f_n t} = 0 \quad (32)$$

and equation (29) results in $$y_{BB}(t) = \sum_{n=0}^{N-1} \tilde{x}_n \cdot e^{j2\pi f_n t}, \quad (33)$$

and based on $$\tilde{x}_n = \hat{x}_n \text{ for } 0 \leq n \leq N-1 \quad (34)$$

equation (33) can be denoted as $$y_{BB}(t) = \sum_{n=0}^{N-1} \hat{x}_n \cdot e^{j2\pi f_n t}, \quad (35)$$

which equals $$y_{BB}(t) = \sum_{n=0}^{N-1} T_n \cdot x \cdot e^{j2\pi f_n t}, \quad (36)$$

being the signal to be upconverted by the modulator 214.

After being processed by the modulator 214 with an optical carrier of a frequency $f_c$, an optical output signal 205 amounts to $$y(t) = \sum_{n=0}^{N-1} T_n \cdot x \cdot e^{j2\pi (f_c + f_n) t}. \quad (37)$$

Figure 3:
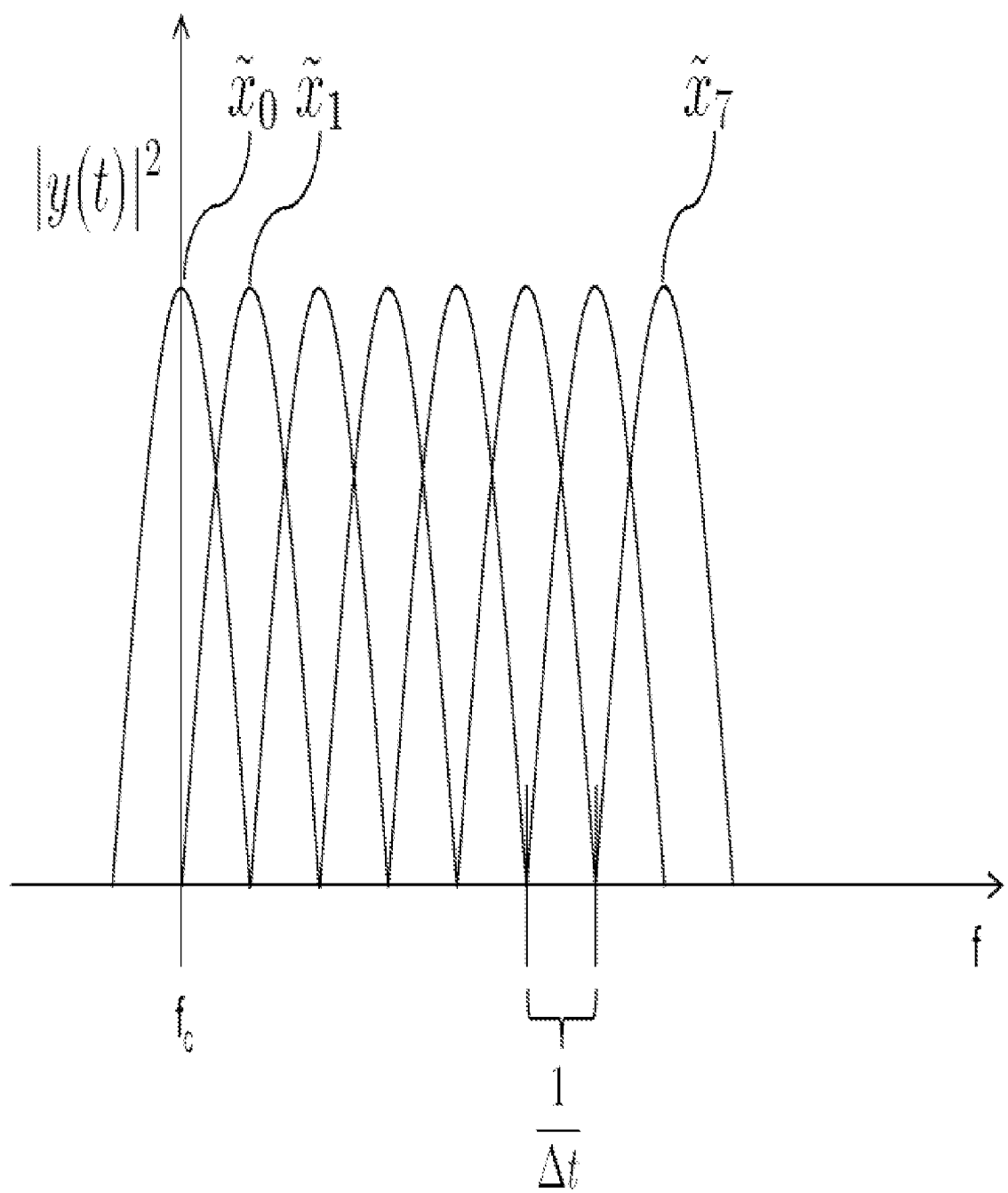
FIG. 3 shows a spectrum of an optical output signal of the transmitter according to FIG. 2.

The spectrum of this optical output signal 205 is visualized by FIG. 3.

Further Advantages

The approach provided in particular bears the following advantages:

(a) The spectral efficiency can be significantly increased utilizing an OFDM-like approach to be compatible with direct detection.

(b) No power is required for sending an optical carrier signal.

(c) A one tap pre-compensation is possible, permitting the transmission over dispersion uncompensated links.

(d) A simple subcarrier selection is possible in the receiver, e.g., by discarding samples, therefore allowing a selection of samples that suffered less from detrimental effects (i.e. use "good subcarriers").

(e) Side information can be sent multiplexed in some subcarriers (pilot tone, training symbols, coding data, protocol data, etc.).

(f) There is no need for complex digital signal processing to be supplied with the receiver.

(g) The approach allows for inexpensive highly spectral efficient systems, e.g., 100 Gbps systems with direct detection, without polarization multiplexing and without DSP for DWDM systems.

(h) There is no need for a local oscillator in the receiver and no need to waste energy transmitting a pilot signal.

LIST OF ABBREVIATIONS

ADC Analog-to-Digital Converter
BER Bit Error Rate
Br Bit Rate
BW Bandwidth
CompSSB-OFDM Compatible Single Sideband OFDM modulation
DAC Digital-to-Analog Converter
DFT Discrete Fourier Transform
DOSM Digital Orthogonal Subcarrier Multiplexing
DPSK Differential Phase Shift Keying
DQPSK Differential Quaternary Phase Shift Keying
DSP Digital Signal Processing
DWDM Dense WDM IDFT Inverse DFT
OFDM Orthogonal Frequency-Division Multiplexing
OOK On Off Keying
PolMux Polarization Multiplexing
QPSK Quaternary Phase Shift Keying
SE Spectral Efficiency
WDM Wavelength Division Multiplexing
ZP Zero Padding

The invention claimed is:

1. A method for processing data in an optical network element, the method comprising:
   receiving a vector of symbols and processing a multicarrier signal;
   linear pre-coding the multicarrier signal to form a linear pre-coded signal, wherein the amplitude of each subcarrier is a linear combination of said symbols,
      wherein coefficients of this linear combination are taken from a matrix T, and
      wherein a value of the signal at a kth sampling point is proportional to a kth element of the vector of symbols, where k is an integer.

2. The method according to claim 1, wherein a channel transfer function is pre-compensated by an equalization.

3. The method according to claim 2, wherein said equalization is a one tap equalization.

4. The method according to claim 1, wherein a subcarrier is received by a receiver and is discarded by the receiver when the subcarrier experiences deforming and/or attenuating effects above a given threshold.

5. The method according to claim 1, wherein a dummy subcarrier is used to provide a guard band.

6. The method according claim 1, wherein an inverse discrete Fourier transform is applied and wherein a zero padding is conducted prior to the inverse discrete Fourier transform.

7. The method according to claim 1, wherein the signal is transmitted to a receiver and wherein a feedback channel is provided to convey information from the receiver to the optical network element.

8. The method according to claim 1, wherein the optical network element is an optical transmitter.

9. An optical network element comprising
   a linear pre-coder receiving a vector of symbols x and processing a multicarrier signal,
   wherein the linear pre-coder pre-codes the multicarrier signal to form a linear pre-coded signal, wherein the amplitude of each subcarrier is a linear combination of said symbols, and wherein coefficients of this linear combination are taken from a matrix T, and
   wherein a value of the signal at a kth sampling point is proportional to a kth element of the vector of symbols, where k is an integer.

10. The optical network element according to claim 9 further comprising a zero padding unit provided as part of the linear pre-coder for applying zero padding, an inverse discrete Fourier transform unit provided as part of the linear pre-coder for applying an inverse discrete Fourier transform and a modulator for modulating the linear pre-coded signal.

11. The optical network element comprising a control unit that is arranged such that the method according to claim 1 is executed.

* * * * *